US007263698B2

(12) United States Patent
Wildhagen et al.

(10) Patent No.: US 7,263,698 B2
(45) Date of Patent: Aug. 28, 2007

(54) PHASED UPGRADE OF A COMPUTING ENVIRONMENT

(75) Inventors: Andreas Wildhagen, Wiesloch (DE); Michael Kretz, Kronau (DE); Jörg Kessler, Nussloch (DE); Prasad Kompalli, Bangalore, IN (US); Heinz Pauly, Ludwigshafen (DE)

(73) Assignee: SAP Aktiengesellschaft, Walldorf (DE)

( * ) Notice: Subject to any disclaimer, the term of this patent is extended or adjusted under 35 U.S.C. 154(b) by 604 days.

(21) Appl. No.: 10/230,407

(22) Filed: Aug. 29, 2002

(65) Prior Publication Data

US 2004/0044998 A1    Mar. 4, 2004

(51) Int. Cl.
    *G06F 9/44*     (2006.01)
(52) U.S. Cl. ............... 717/170; 717/168; 717/169; 717/171; 717/172; 717/173
(58) Field of Classification Search ........ 717/168–173; 719/312–313, 319, 329
    See application file for complete search history.

(56) References Cited

U.S. PATENT DOCUMENTS

| 4,714,995 | A |   | 12/1987 | Materna et al. |
|---|---|---|---|---|
| 5,421,017 | A | * | 5/1995 | Scholz et al. ............... 717/170 |
| 5,555,418 | A | * | 9/1996 | Nilsson et al. ............... 717/153 |
| 5,721,912 | A |   | 2/1998 | Stepczyk et al. |
| 5,778,373 | A |   | 7/1998 | Levy et al. |
| 5,870,605 | A |   | 2/1999 | Bracho et al. |
| 5,870,765 | A |   | 2/1999 | Bauer et al. |
| 5,873,096 | A |   | 2/1999 | Lim et al. |
| 5,960,189 | A |   | 9/1999 | Stupek, Jr. et al. |
| 6,256,676 | B1 |   | 7/2001 | Taylor et al. |
| 6,360,363 | B1 | * | 3/2002 | Moser et al. ............... 717/170 |
| 6,367,077 | B1 |   | 4/2002 | Brodersen et al. |
| 6,385,770 | B1 | * | 5/2002 | Sinander .................... 717/170 |
| 6,446,092 | B1 |   | 9/2002 | Sutter |
| 6,477,545 | B1 | * | 11/2002 | LaRue ........................ 707/201 |
| 6,857,121 | B1 | * | 2/2005 | Wadt ........................... 717/170 |
| 2001/0018690 | A1 |   | 8/2001 | Ng et al. |

FOREIGN PATENT DOCUMENTS

| EP | 0 592 045 | 4/1994 |
|---|---|---|
| WO | WO93/04436 | 3/1993 |
| WO | WO 00/79408 | 12/2000 |
| WO | WO 01/27806 | 4/2001 |
| WO | WO 02/97664 | 5/2002 |

OTHER PUBLICATIONS

Durbaon, S.D., et al., Interconnection of Distributed Components: An Overview of Current Middleware Solutions, Journal of Computing and Information Science in Engineering, vol. 1, Mar. 2001, pp. 23-31.

Gray et al., The Dangers of Replication and a Solution, ACM SIGMOD Record, Jun. 1996, pp. 173-182.

Huston et al., Disconnected Operation for AFS, Proceedings of the USENIX Mobile and Location-Independent Computing Symposium, Cambridge, MA, Aug. 2-31993, USENIX Association, pp. 1-10.

* cited by examiner

*Primary Examiner*—William H. Wood
(74) *Attorney, Agent, or Firm*—Fish & Richardson P.C.

(57) ABSTRACT

Techniques are provided to permit a gradual or phased migration of a computing environment including groups of mobile clients to a new version of an application program such that the unavailability or downtime of any mobile client is minimized. In one general aspect, the techniques permit a mobile client to connect with an application server of the corresponding version for synchronization whether the mobile client is operating on the starting-version or the new or target-version of the application program and migrates the data between the two versions of the application program. A migration bridge between the starting-version and the target-version of the application program synchronizes the data in the two versions of the application program.

23 Claims, 5 Drawing Sheets

PHASED UPGRADE OF A COMPUTING ENVIRONMENT

TECHNICAL FIELD

This description relates to techniques for upgrading a computing environment.

BACKGROUND

An application program or system may include on-line and off-line components. Examples of application programs or systems include an enterprise application, such as a resource management system, a customer relationship management system, a human resources management system, a supply chain management system, and a financial management system.

An enterprise application may operate using a client/server architecture in which the client system performs the application processing functions and the server system performs the data management, synchronization, and messaging functions. Some enterprise applications include both on-line client systems and off-line client systems. Such an arrangement may be particularly beneficial when a mobile computing device is used with only intermittent access to a connection to the server. An off-line client system may be used, for example, by a sales representative or service technician while working at a customer location.

An on-line client, such as a desktop computer or a workstation, may use a version of an application program that receives data from a central data repository and updates the central data repository when a user of the on-line client is performing business processes. An off-line client, such as a laptop, a personal digital assistant, or another mobile computing device, may also be referred to as a mobile client. A mobile client may use a version of the application program that receives data from a user of the mobile client and updates data stored on the mobile client. Typically, a mobile client operates a single-user version of the application program. The mobile client may periodically synchronize the data stored on the mobile client with the data stored at the central data repository. A mobile client may use a network connection with the central data repository to communicate during synchronization.

When a new version of an application program is implemented, the server system, each mobile client, and each on-line client may need to be modified to use the new version (which may be referred to as upgrading the computing environment). Upgrading the mobile client may include installing, for example, an application program, the data associated with the application program, and the support software for the application program, such as a database management system or communication software. Upgrading all mobile clients may take a substantial period of time, during which the mobile clients may not be available. By contrast, upgrading an on-line client that uses a persistent network connection to the central repository may take a much shorter period of time because, for instance, the data management functions do not have to be modified at each on-line client. Upgrading the server system may include modifying a central data repository and adapting the modified central data repository for use by the mobile clients. Adapting the modified central data repository may take a substantial period of time when data sets or synchronization processes need to be modified for particular mobile clients or groups of mobile clients.

Minimizing the length of time that a particular mobile client is unavailable to a particular user (which may be referred to as downtime) may be desirable. Minimizing the length of downtime during an upgrade may be particularly advantageous when the time required to upgrade all mobile clients is substantial, such as when a large number of mobile clients need to be upgraded or when a central data repository needs to be adapted for particular mobile clients or groups of mobile clients. Minimizing the length of downtime also may be advantageous when the inability of a user to use a mobile client may result in a loss of revenue, such as when a sales representative uses a mobile client to enter or process sales orders placed by customers.

The upgrade process may be further complicated when a mobile client may connect for synchronization only to a version of the application server program that corresponds to a version used by the mobile client. For example, a mobile client that operates a new version (or target version) of the application may connect only with an application server that operates the new version, and a mobile client that operates the starting version (or original version) may connect only with an application server that operates the starting version).

One approach to upgrading an application program to another version may be to operate the two versions in parallel. The two application program versions may be operated on separate computer systems and clients connect to the appropriate computer system. In a distributed computing environment, the data from both versions may be sent to a centralized data repository.

SUMMARY

Techniques are provided to permit an upgrade of a computing environment including groups of mobile clients in phases to a new version of an application program such that the unavailability of any one mobile client is minimized. In one general aspect, the techniques permit a mobile client to connect with an application server of the corresponding version for synchronization whether the mobile client is using the starting version or the target version of the application program. A migration bridge between the starting version and the target version of the application program synchronizes the data stored for each of the two versions.

In one general aspect, when a computing environment including a group of mobile clients is upgraded, a starting-version application accessible to one or more starting-version mobile clients and a target-version application accessible to one or more target-version mobile clients are operated. A data exchange message is sent from the starting-version application to the target-version application. The data exchange message includes one or more starting-version data modifications associated with the data exchange message. After receiving the data exchange message and the one or more starting-version data modifications associated with the data exchange message, the target-version application stores the one or more starting-version data modifications associated with the data exchange message such that the one or more starting-version data modifications are available to the one or more target-version mobile clients. One or more of the starting-version mobile clients are modified from accessing the starting-version application to accessing the target-version application. The modifying is repeated until all starting-version mobile clients have been modified to access the target-version application.

Implementations may include one or more of the following features. For example, one or more starting-version data modifications may be identified. A starting-version application accessible to one or more starting-version mobile clients may be operated using a first computer system, and a target-version application accessible to one or more target-version mobile clients may be operated using a second, different computer system. Both applications also may be operated using the same computer system.

The target-version application may validate the starting-version data modifications associated with the data exchange message, store the starting-version data modifications associated with the data exchange message such that the starting-version data modifications are available to the target-version mobile clients only when the starting-version data modifications associated with the data exchange message are valid, and send an acknowledgement message to the starting-version application. The target-version application may be accessible to one or more target-version mobile clients and one or more on-line clients. The starting-version data modifications associated with the data exchange message may be stored such that the starting-version data modifications are available to the starting-version mobile clients only when the starting-version data modifications associated with the data exchange message are valid.

A starting-version synchronization message and one or more starting-version data modifications associated with the starting-version synchronization message may be received from a starting-version mobile client. The starting-version data modifications associated with the starting-version synchronization message may be copied into the data exchange message.

The starting-version data modifications associated with the data exchange message may be copied into a target-version synchronization message and may be associated with the target-version synchronization message. The target-version synchronization message and the starting-version data modifications associated with the target-version synchronization message may be sent to at least one of the target-version mobile clients. A second data exchange message may be sent to the starting-version application program. The second data exchange message may include one or more target-version data modifications associated with the second data exchange message The starting-version application, after receiving the second data exchange message and the target-version data modifications associated with the second data exchange message, may store the target-version data modifications associated with the second data exchange message such that the target-version data modifications are available to at least one of the starting-version mobile clients.

A target-version synchronization message and the target-version data modifications associated with the target-version synchronization message may be received from a target-version mobile client. The target-version data modifications associated with the target-version synchronization message may be copied into the second data exchange message.

The target-version data modifications associated with the second data exchange message may be copied into a starting-version synchronization message and associated with the starting-version synchronization message. The starting-version synchronization message and the target-version data modifications associated with the starting-version synchronization message may be sent to at least one of the starting-version mobile clients. The structure of the second data exchange message may be the same as or different from the structure of the first data exchange message.

Implementations of the techniques discussed above may include a method or process, an apparatus or system, or computer software on a computer-accessible medium. The details of one or more of the implementations are set forth in the accompanying drawings and description below. Other features will be apparent from the description and drawings, and from the claims.

DESCRIPTION OF THE DRAWINGS

Like reference symbols in the various drawings indicate like elements.

DETAILED DESCRIPTION

Figure 1:
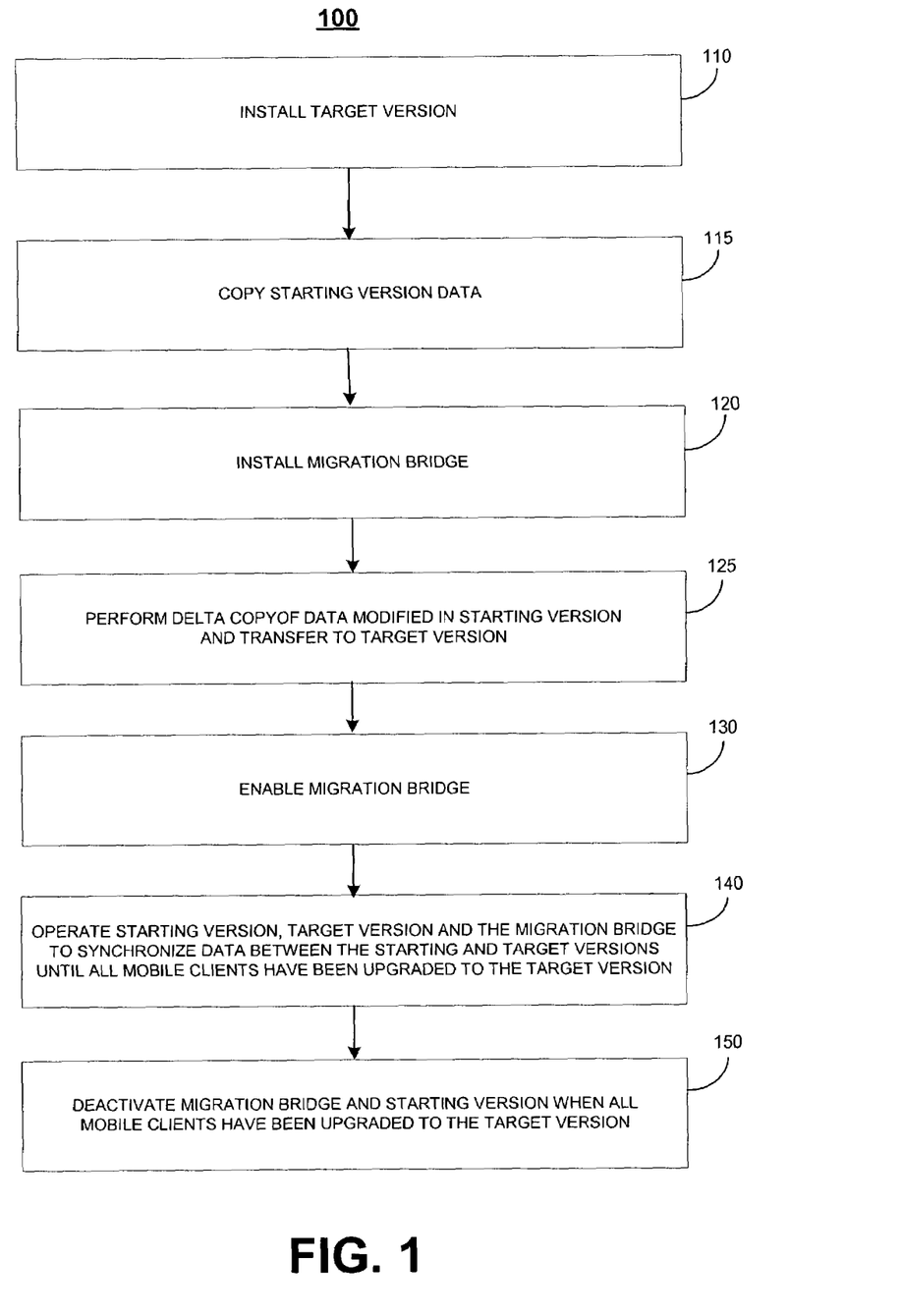
FIG. 1 is a flow chart of a process for upgrading a computing environment including groups of mobile clients in phases from a starting version to a target version of an application program.

FIG. 1 depicts a process 100 that may be used to upgrade a computing environment including groups of mobile clients in phases from a starting version to a target version of an application program. The process 100 begins with the installation of a target version of the application program on a server that provides connectivity to online clients and mobile clients during synchronization (step 110). To accomplish this, a copy of the starting version of the application program is created and installed on a target-version application server. The target-version application program may operate on the same physical server as the starting-version application program, or the target-version and starting-version application programs may operate on different physical servers. The copy of the starting version of the application program on the target-version application server is then upgraded to the target version of the application program. For example, application program changes and data changes (such as reference data) provided by the vendor of the application program may be applied to the copy of the starting version on the target-version application server. The unmodified starting version of the application program is not upgraded and remains in operation to support the mobile clients and the on-line clients.

Alternatively, some implementations may install a target version by loading the target version. Any customer enhancements that had been made to the starting version or needed to be made to the target version are applied to the target version. The starting version of the application program remains in operation to support the mobile clients and the on-line clients. Other implementations may use different software engineering methods or processes to install the target version of application program, including the data needed for the target version of the application program.

Data associated with the starting version of the application program is copied from the starting version to the target version of the application program (step 115). This may be referred to as a system copy or an initial data load. The system copy transfers the data that has been validated and stored in the starting version at the time that the system copy is performed.

Next, a migration bridge that links the starting version to the target version of the application program is installed (step 120). One component of the migration bridge is installed on the starting-version application server, and another component is installed on the target-version application server. The migration bridge is software that provides data exchange between the starting version and the target version of the application program such that data entered into one of the versions is provided to the other version. The migration bridge is described further with respect to FIG. 4.

The use of a migration bridge permits groups of mobile clients to be upgraded to the target version of the application program in a way that reduces the downtime of any one mobile client. Upgrading a mobile client generally includes installing on the mobile client the target version of the application program, data structures associated with the target version of the application program, and any other programs or data necessary to operate the target version of the application program. The use of a migration bridge permits the operation of two versions of an application program in separate operating environments. A gradual or phased upgrade of groups of mobile clients to a new version of an application program may be accomplished through the use of a migration bridge that synchronizes the data used by each version of the application program.

In some cases, the on-line clients and the mobile clients use the starting version of the application program while the target version is installed (step 110), data from the starting version is copied (step 115), and the migration bridge is installed (step 120). This may occur, for example, when the time to install the target version is substantial as when the application program is an enterprise resource planning system, a customer relationship management system, a human resources management system, a supply chain management system, a financial management system or another enterprise system, when customer enhancements are made to the target version during installation, or when quality assurance or user acceptance procedures require a significant period of time for testing to be conducted.

Any data of the starting version that is entered or modified by the mobile clients or the on-line clients while the target version was installed is copied and transferred to the target version (step 125). This may be referred to as a delta copy for only the changed data is copied from the starting version to the target version. This may help ensure that all data changes that have occurred since the system copy are transferred to the target version. The identification of the changed data may be accomplished, for example, by collecting the data changes made to the starting version in a list or table as the changes occur. Alternatively, the data changes may be collected in a list or table after the changes were made based on a date-stamp or date/time-stamp on the changed data. The collected data are then copied to the target version using the list or table to identify which data objects are to be copied. Other implementations may copy all of the application program data from the starting version to the target version. The copying is performed after the target version has been installed on the application server and before any clients are given access to use the target version.

When the target version has been installed, the migration bridge has been installed and the validated starting version data has been transferred to the target system (e.g., through a system copy and a delta copy), the migration bridge is enabled (step 130). When the migration bridge is enabled, the on-line clients may be shifted from using the starting version to using the target version. Then both the starting version and the target version of the application program operate and the migration bridge synchronizes data between the starting and target versions until all of the mobile clients have been upgraded to the target version of the application program (step 140). Some mobile clients use the starting version of the application program and connect to the starting version of the application server to synchronize the mobile client data with the application server data. Some mobile clients use the target version of the application program and connect to the target version of the application server to synchronize the mobile client data with the application server data.

The migration bridge sends the data modifications entered by the starting-version mobile clients from the starting-version application server to the target-version application server, which then validates the data and sends the data to the target-version mobile clients when each target-version mobile client synchronizes with the target-version application server. Similarly, the migration bridge sends the data modifications entered by the target-version mobile clients and any on-line clients from the target-version application server to the starting-version application server for subsequent transmission to the starting-version mobile clients. The migration bridge is described further with respect to FIGS. 2, 4 and 5. When all the mobile clients have been migrated, the migration bridge and the starting version of the application program are deactivated (step 150).

Figure 2:
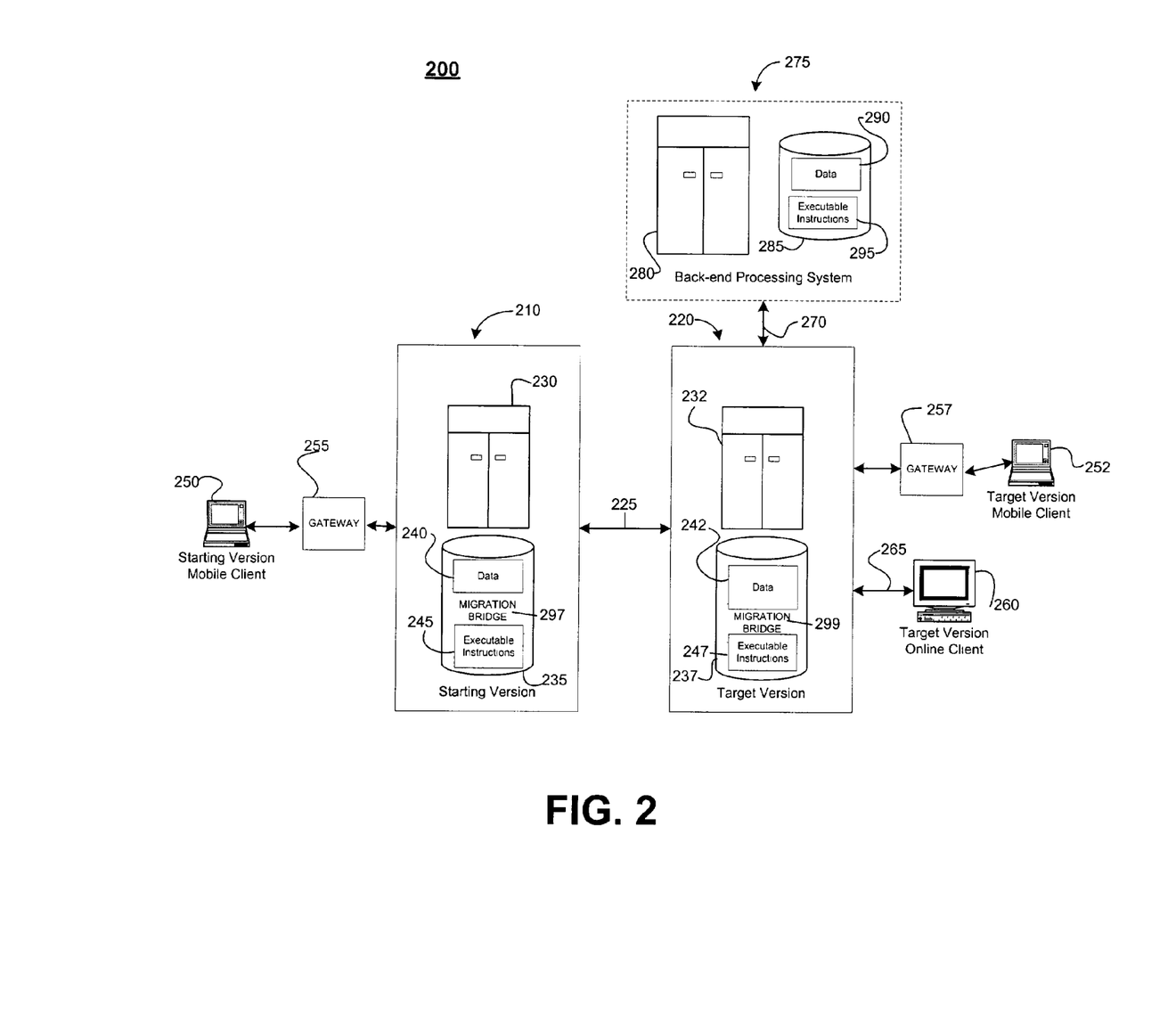
FIG. 2 is a block diagram of a system for upgrading a computing environment including groups of mobile clients in phases from a starting version to a target version of an application program.

FIG. 2 shows a block diagram of a system 200 that may be used to upgrade a computing environment including groups of mobile clients in phases from a starting version to a target version of an application program or system. Computer system 210 operates a starting version of the application program, and computer system 220 operates a target version of the application program. Computer systems 210 and 220 are capable of delivering and exchanging data through a communication pathway 225. As is conventional, computer system 210 or 220 includes a server 230 or 232 and a data storage device 235 or 237 associated with each server. Each of the data storage devices 235 and 237 includes data 240 or 242 and executable instructions 245 or 247 for a version of an application program on computer system 210 or 220.

Each of the computer systems 210 and 220 includes a mobile client 250 or 252 connected to the computer system 210 or 220 through a communication gateway 255 or 257. For brevity, FIG. 2 illustrates only a single mobile client 250 and 252 for each computer system. Computer system 220 also includes a target-version on-line client 260 connected through a communication pathway 265 to the computer system 220. A target-version on-line client 260 and a computer system 220 may be arranged to operate within or in concert with one or more other systems, such as, for example, one or more LANs ("Local Area Networks") and/or one or more WANs ("Wide Area Networks").

A target-version on-line client 260 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program). For brevity, FIG. 2 illustrates only a single on-line client 260 for computer system 220.

A mobile client 250 or 252 may be a general-purpose computer, such as a laptop, a special-purpose computer, or another mobile computing device, such as a personal digital assistant ("PDA") or a portable personal communicator. A mobile client 250 or 252 provides a user of the mobile client with a subset of the functions and data provided by the application server to the on-line client 260. Each mobile client 250 or 252 stores the executable instructions and data used by the mobile client user. Each mobile client periodically synchronizes the data stored on the mobile client with the data stored on the computer system 210 or 220 using middleware. The middleware is stored as a set of executable instructions 245 or 247 on computer system 210 or 220 and stored as a set of executable instructions (not shown) on mobile client 250 or 252. The middleware directs data exchange messages between a mobile client 250 or 252 and the computer system 210 or 220 and uses different types of message structures to communicate different data structures. Data is stored on the mobile client 250 or 252 and the computer system 210 or 220 in an database. The data is logically organized into a series of objects. Each object type is associated with a series of attributes. Each object is associated with a series of attribute values fitting to the attributes of the corresponding object type.

A communication gateway 255 or 257 may connect to mobile client 250 or 252 or computer system 210 or 220 through the Internet, the World Wide Web, WANs, LANs, analog or digital wired and wireless telephone networks, satellite, and/or any other delivery mechanism for carrying data. A communication gateway 255 or 257 may connect through, for example, a wired, wireless, cable, or satellite communication pathway.

The computer system 220 that operates the target version of the application program is capable of delivering and exchanging data through a communications link 270 with a computer system 275 that operates another application program, such as a back-end processing system that does not directly interact with any of the clients of the target version or the starting version of the application program. The computer system 275 includes a processor 280 and a data storage device 285. The data storage device 285 includes data 290 and executable instructions 295 for the application program operating on computer system 275.

A user of a mobile client 250 operates a starting version of the application program. In the example of a customer relationship management application, the mobile client 250 may be used to enter new customer information, prepare bids for a customer, or enter a product order for a customer while operating in an off-line mode and not connected to computer system 210. The user of a mobile client 250 periodically connects to computer system 210 and sends data modifications entered using the mobile client 250 to the computer system 210, which operates a starting version of the application program. The mobile client 250 sends data modifications made using the mobile client 250 to the computer system 210 using communication gateway 255.

Computer system 210 uses a starting-version migration bridge 297 to package the received data modifications into one or more transfer messages (such as the data exchange message described with respect to FIG. 3) that are sent to the computer system 220 through communication pathway 225. As discussed below, the starting-version migration bridge 297 includes data and executable instructions.

Computer system 220 operates a target version of the application program. The computer system 220 validates the data modifications received in transfer messages, stores the data modifications in data storage 242, and sends an acknowledgment message to computer system 210 using communication pathway 225. The data modifications from the starting version of the application program then are available for access by a user of the target-version on-line client 260 and for synchronization with the target-version mobile client 252.

Computer system 210 receives the acknowledgement message sent from computer system 220. When the acknowledgement message indicates that the data modifications have been successfully validated, computer system 210 stores the data modifications in the starting-version application data 240. The data modifications then are available for synchronization with starting-version mobile client 250.

Similarly, the data modifications entered by a user of a target-version mobile client 252 are sent to the target version of the application program operating on computer system 220 using a communication gateway 257 when target-version mobile client 252 synchronizes data. Computer system 220 validates the data modifications and stores the data modifications in data store 242. The user of target-version on-line client 260 accesses data 242 stored on computer system 220. The computer system 220 uses a target-version migration bridge 299 to package data modifications made by the target-version on-line client 260 or received from the target-version mobile client 252 into one or more transfer messages (such as the data exchange message described with respect to FIG. 3) that are sent to the computer system 210 through communication pathway 225. As discussed below, the target-version migration bridge 299 includes data and executable instructions.

The computer system 210 stores the target-version data modifications in data storage 240. In some implementations, the computer system 210 may send an acknowledgment message or other type of message to computer system 220 using communication pathway 225. The data modifications from the target version of the application program then are available for access by a user of the starting-version mobile client 250.

The computer system 220 sends the target-version data modifications and the starting-version data modifications that are needed by the back-end processing system to computer system 275 using communication pathway 270. The computer system 275 stores the received data modifications such that application programs running on the back-end processing system have access to the data.

Similarly, data from the back-end processing system that are needed by the target-version or the starting-version of the application program are sent by the computer system 275 using communication pathway 270 to computer system 220. The computer system 220 stores the received data in data storage 242 where the data are available for access by a user of the target-version on-line client 260 and a user of the target-version mobile client 252 after synchronization of the data stored on the target-version mobile client 252 with the data stored on the computer system 220.

The computer system 220 sends the data modifications received from computer system 275 that are needed by the users of the starting version of the application program to computer system 210 through communication pathway 225. The computer system 210 stores the received data in data storage 240 where the data are available for access by a user of the starting-version mobile client 250.

In some implementations, the starting-version migration bridge 297 may replace the decision logic of the starting version of the application program on computer system 210. Additionally or alternatively, the target-version migration bridge 299 may receive the data modifications for distribution to mobile client 252 and on-line client 260 after the data modifications have been received by the target version of the application program (e.g., for validation).

Figure 3:
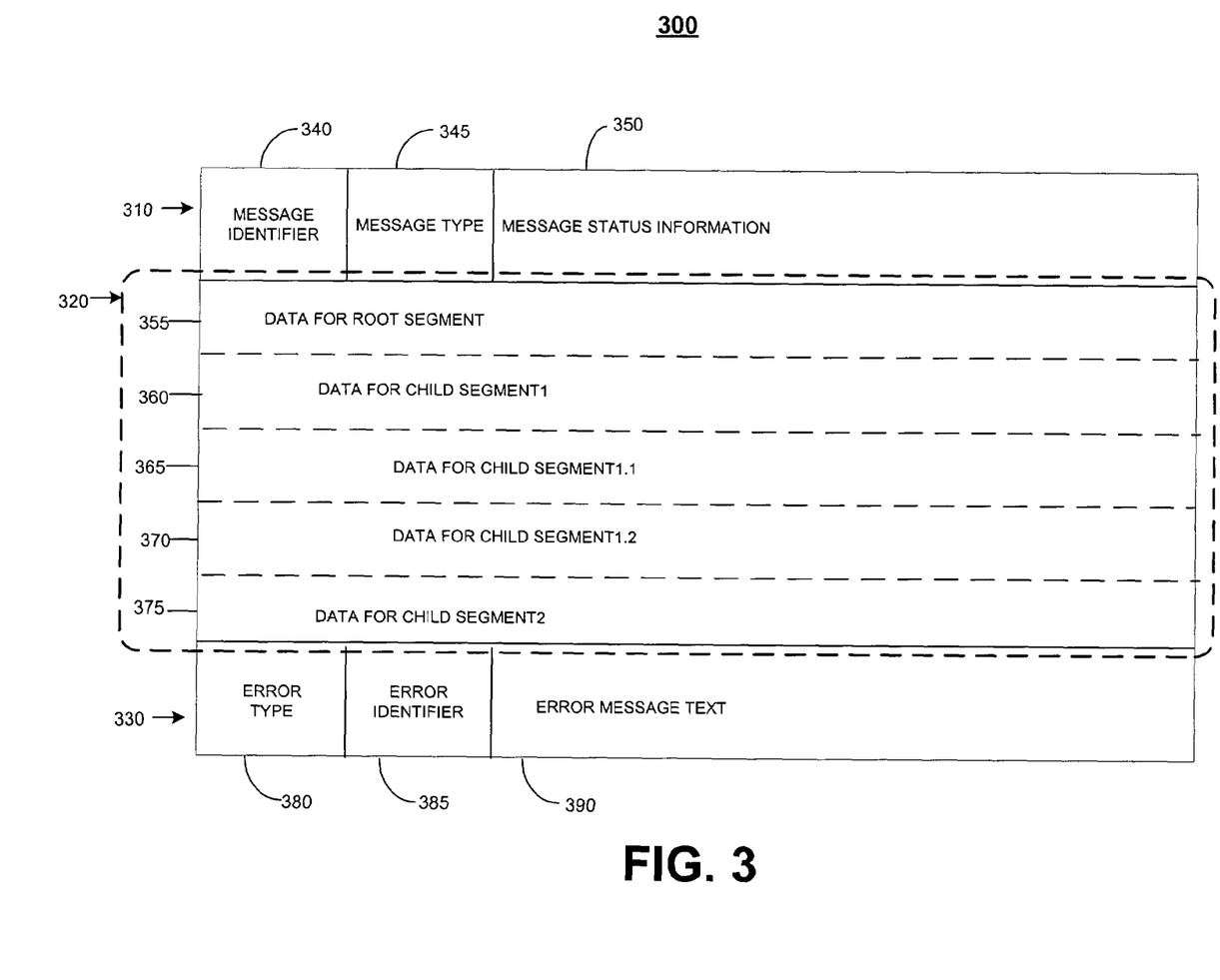
FIG. 3 is a diagram of the structure of a data exchange message used in migrating data between a starting version and a target version of an application program.
Figure 4:
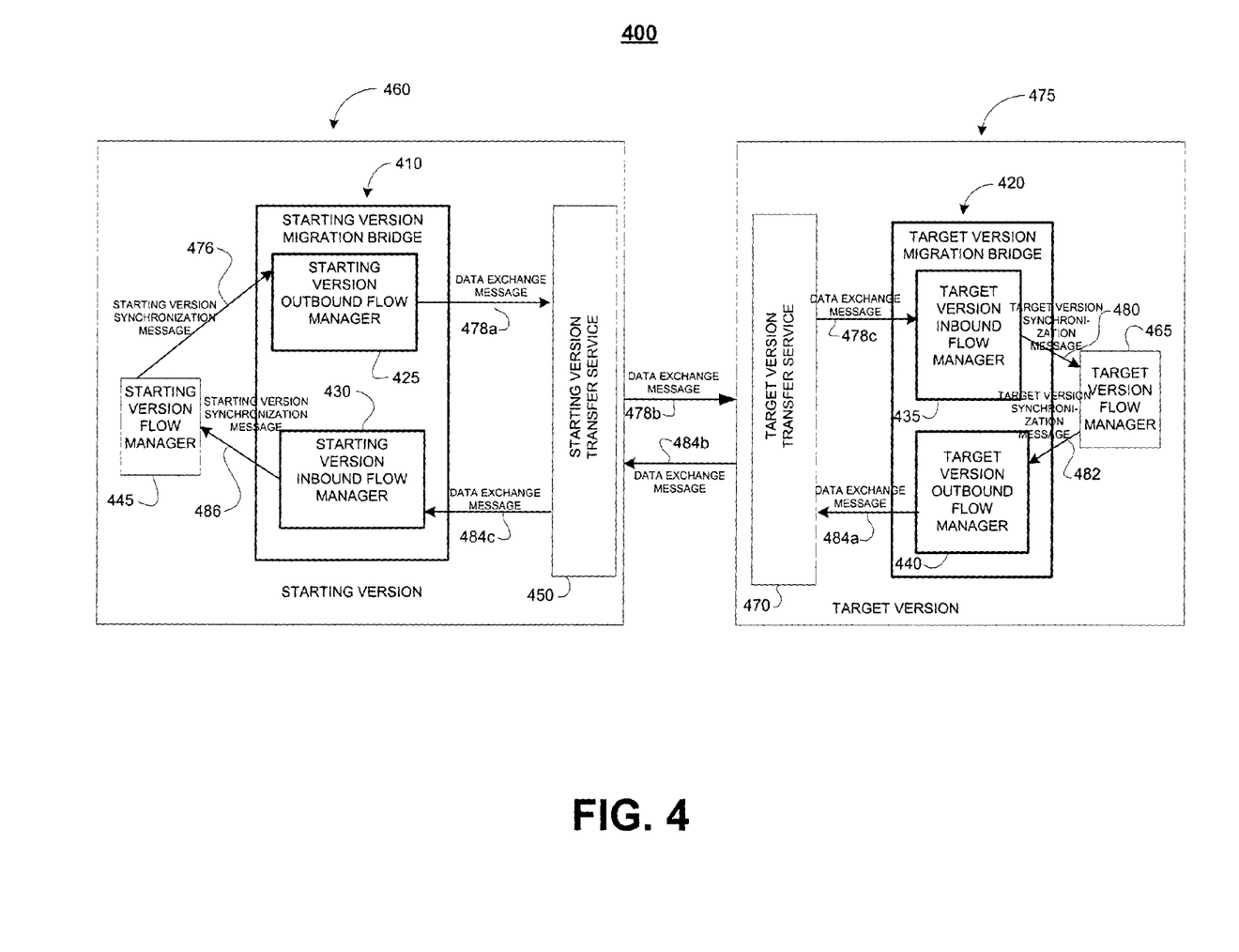
FIG. 4 is a diagram of the components of a software architecture for migrating data between a starting version and a target version of an application program.
Figure 5:
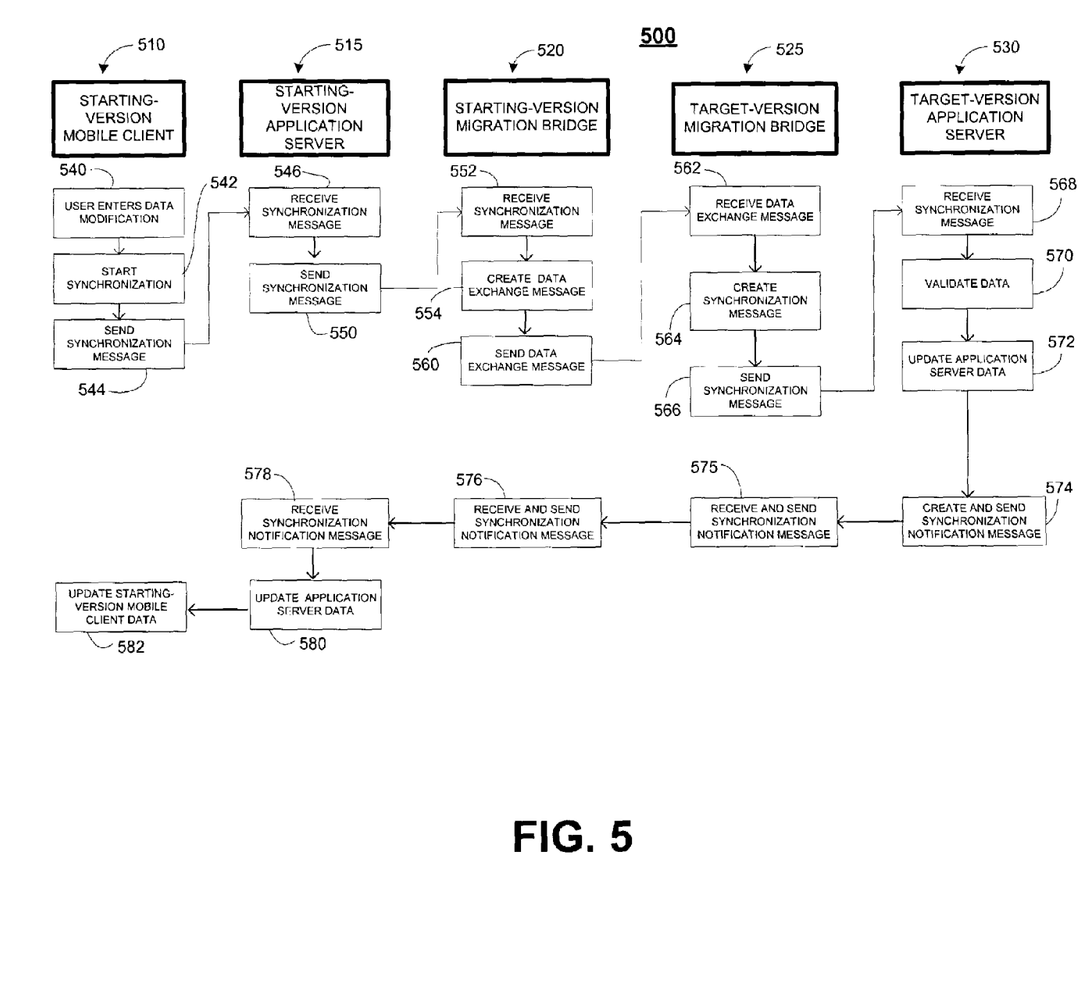
FIG. 5 is a diagram illustrating communications to migrate data entered by a starting version mobile client to a target version mobile client.

Referring to FIGS. 3-5, a particular implementation of a commercial-off-the-shelf application program is described for illustrative purposes. The application program is used by users of mobile clients and by users of on-line clients and includes instructions and data created, modified, and accessed by the application program. Some of the executable instructions are directed to performing business functions. Other executable instructions (which may be referred to as middleware) are directed to performing communication functions with other application programs. An application server stores the executable instructions and data for the application program accessed by the on-line clients.

FIG. 3 shows an example data exchange message 300 for transferring data between a starting version and a target version of an application program. The example data exchange message 300 includes a message header 310, message data 320, and error information 330.

The message header 310 includes a message identifier 340, a message type 345, and message status information 350. The message identifier 340 uniquely identifies a particular message. The message type 345 identifies the particular message type of several possible message types used. Often message type 345 is only included in the implementation of a data exchange message when there are several possible types of messages. For example, some implementations may use one type of message for data modifications having to do with customer information and another type of message for data modifications having to do with placing or modifying a product order. Message status information 350 includes information that relates to the status of the data exchange message. For example, message status information 350 may include the time that the message was sent and/or the time that the message was received. Some implementations also may include processing state information, such as whether the data modifications in the data exchange message have been validated by the target-version application program.

Message data 320 includes starting version data modifications, target version data modifications, or other payload data transported in the data exchange message 300. Message data 320 also may be referred to as a message body or a message payload. Message data 320 includes data segments 355, 360, 365, 370, and 375. Data segments 355, 360, 365, 370, and 375 are organized as hierarchical or nested data segments. Data segment 355 includes data for the root segment and is the top-level data segment for the message. Data segment 360 includes data for a first child segment and is directly related to root data segment 355. Data segments 365 and 370 each are related to the first child data segment 360. Data segment 375 includes data for a second child segment and is directly related to root data segment 355.

In the example data exchange message 300, root data segment 355 may include data for a new product order. Root data segment 355 may include an order number, a customer number, and the date that the product order was placed. First child segment 360 may include data for the particular products ordered, such as a reference number that may be associated with the products ordered. Data segments 365 and 370 each may include data for a particular product ordered, such as a product number, a quantity, and a price for a particular product ordered. Second child segment 375 may include the address (e.g., street address, city, state, and country) to which the products are to be delivered. In some cases, one or more of the data segments 355, 360, 365, 370, and 375 may be empty (e.g., a particular data segment may not contain any data values).

Some implementations may include only one data segment or may include one or more data segments that may not be organized as hierarchical or nested data segments. In some cases, the message data 320 may contain other types of aggregations of data, such as one or more object instances, one or more data fields or attributes that are not organized as a data segment, or one or more rows in a database table.

In some implementations, each data segment may include a data portion and a control data portion. The data portion may contain the data field or attribute values that are sent in the data exchange message. Control data may include a database operation indicator that indicates the type of database operation that applies to the data segment. Database operation indicators may include update, insert, or delete operations. Control data also may include one or more database operation indicators, each of which indicates the type of database operation that applies to a particular data value (e.g., a data field value or attribute value) in the data portion of the data segment. For example, control data that includes a series of database operation indicators for particular data values may facilitate the transmission of only data values that are modified by a database update operation. When only the changed data values are updated, the efficiency with which the data exchange messages are processed may be improved. Control data also may include other types of processing information, such as an indication that no database operation is required for the data segment.

In a particular implementation, each data segment includes a data portion, a data segment control portion that indicates the database operation to be applied to the data segment, and a series of database operation indicators. Each database operation indicator in the series of database operation indicators corresponds to a data field in the data portion. The series of database operation indicators only are used when the data segment control indicates a type of database operation that applies to a data field. For example, the series of database operation indicators may be used only when the data segment is to be updated (which is a field-level operation). In this example, the series of database operation indicators may not be used when the data segment control indicates a type of database operation that applies to a data segment, such as when a data segment is to be inserted into a database or when a data segment is to be deleted from a database.

Error information 330 includes an error type 380, an error identifier 385, and an error message text 390. The error type 380 may indicate the level or severity of error that has occurred. For example, the error type 380 may indicate whether the processing of the data exchange message has been was interrupted (e.g., a critical error) or not (e.g., a warning). The error identifier 385 uniquely identifies the particular error that occurred. The error message text 390 may be presented to a user to describe the particular error that occurred. Error information 330 only contains data values when an error relating to the data exchange message has occurred. Some implementations may not include error information in a data exchange message or may include alternative or additional types of error information.

FIG. 4 depicts the components of a software architecture 400 for migrating data between a starting version and a target version of an application program. The software architecture 400 includes a starting-version migration bridge 410 on the starting-version application server, such as computer system 210 in FIG. 2, and a target-version migration bridge 420 on the target-version application server, such as computer system 220 in FIG. 2. Starting-version migration bridge 410 includes a starting-version outbound flow manager 425 and a starting-version inbound flow manager 430. Similarly, target-version migration bridge 420 includes a target-version outbound flow manager 435 and a target-version inbound flow manager 440.

Starting-version migration bridge 410 communicates with starting-version flow manager 445 and starting-version transfer service 450, which are components of the middleware used by the starting-version application program 460. Similarly, target-version migration bridge 420 communicates with target-version flow manager 465 and target-version transfer service 470, which are components of the middleware used by the target-version application program 475. In some implementations the starting-version transfer service 450 and the target-version transfer service 470 may be the same. The same transfer service may be used, for example, when the transfer service performs the technical transfer of messages without performing any application-specific decision logic or other processing. Some implementations may include the services performed by a version transfer service 450 or 470 and a flow manager 445 or 465 as part of one or more functions provided by the starting-version application program or as one of the functions provided by the migration bridge 410 or 420.

The components of the software architecture 400 are used to migrate data from a starting-version application to the target-version application. When a user of the starting-version application modifies data, the starting-version outbound flow manager 425 of the starting-version migration bridge 410 receives a starting-version synchronization message 476. The message 476 comes from the starting-version flow manager 445, which controls the starting-version application program synchronization flow between the application server and the mobile clients. The message 476 identifies application data in the starting version application that has been modified by a mobile client, such as starting-version mobile client 250 in FIG. 2. The starting-version outbound flow manager 425 packages the application data identified by the message 476 into a data exchange message using a transfer data structure that is appropriate for the type of data received in the starting-version synchronization message 476. The data exchange message may include meta-information and data content (e.g., payload) of a transfer data structure. The starting-version outbound flow manager 425 sends the data exchange message 478a to the starting-version transfer service 450, which forwards the data exchange message 478b to the target-version transfer server 470. The target-version transfer server 470 then forwards the data exchange message 478c to the target-version inbound flow manager 435.

The target-version inbound flow manager 435 receives the data exchange message 478c, performs application-specific validation and/or other types of data validation for the received data, packages the received data into a target-version synchronization message, and sends the target-version synchronization message 480 to the target-version flow manager 465. The target-version flow manager 465 provides messaging services within the target-version application program. These messages, for example, control the target-version application program synchronization flow between the application server and the mobile clients or on-line clients, such as target-version mobile client 252 and target-version on-line client 260 in FIG. 2. In some implementations, the target-version application program may perform application-specification validation for the received data in addition to, or in lieu of, the validation performed by the target-version inbound flow manager 435.

The components of the software architecture 400 also are used to migrate data from a target-version application to the starting-version application. When a user of the target-version application modifies data, the target-version outbound flow manager 440 of the target-version migration bridge 420 receives a target-version synchronization message 482. The message 482 comes from the target-version flow manager 465, which controls the target-version application program synchronization flow between the application server and the mobile clients or on-line clients. The message 482 identifies application data that has been modified by in the target-version application program. The target-version outbound flow manager 440 packages the data identified by the message 482 into a data exchange message using a transfer data structure that is appropriate for the type of data received and sends the data exchange message 484a to the target-version transfer service 470, which sends the data exchange message 484b to the starting-version transfer service 450.

The starting-version transfer service 450 forwards the transfer message to the starting-version inbound flow manager 430. The starting-version inbound flow manager 430 receives the data exchange message 484c from the starting-version transfer service 450, packages the received data into a starting-version synchronization message, and sends the starting-version synchronization message 486 to the starting-version flow manager 445. The starting-version flow manager 445 provides messaging services within the target-version application program and sends the received data to the starting-version application program where the data is stored and accessible to the starting-version mobile clients, such as starting-version mobile client 250 of FIG. 2.

Referring to FIG. 5, a procedure 500 may be used to migrate data between a starting version and a target version of an application program. The migration procedure 500 involves a starting-version mobile client 510, such as starting-version mobile client 250 in FIG. 2, that initiates a data modification; a starting-version application server 515, such as computer system 210 in FIG. 2; a starting-version migration bridge 520, such as one similar to the starting-version migration bridge software architecture 410 described with respect to FIG. 4; a target-version migration bridge 525, such as one similar to the target-version migration bridge software architecture 210 described with respect to FIG. 4; and a target-version application server 530, such as the computer system 220 in FIG. 2.

The procedure 500 begins when a user modifies data, such as by adding, changing, or deleting data, in the starting-version application program that is stored on the starting-version mobile client 510 (step 540). After entering the data modification, either immediately or after an interval of time has occurred, the user associated with the mobile client initiates a synchronization function to synchronize data on the starting-version mobile client 510 with the starting-version application server 515 (step 542). The starting-version mobile client 510 sends a starting-version synchronization message to the starting-version application server 515 (step 544).

The starting-version application server 515 receives the starting-version synchronization message (step 546) and sends the starting-version synchronization message to the starting-version migration bridge 520 (step 550).

The starting-version migration bridge 520 receives the starting-version synchronization message (step 552) and creates a data exchange message based on the type of starting-version synchronization message received (step 554). This may be accomplished, for example, by having a table or list that associates a particular type of starting-version synchronization message with a particular type of data exchange message. For example, the type of starting-version synchronization message that is used to send messages for data changes made to a customer information object may correspond to a data exchange message for customer data, and a starting-version synchronization message that is used to send product order data to the starting-version application server may correspond to a data exchange message for product order data. The data received in the starting-version synchronization message received is included in the data exchange message. The starting-version migration bridge 520 also may perform any data transformations required. The starting-version migration bridge 520 then sends the data exchange message to the target-version migration bridge 525 (step 560).

The target-version migration bridge 525 receives the data exchange message (step 562) and creates a synchronization message that includes the data received in the data exchange message (step 564). For example, the target-version migration bridge 525 may use a table or list to identify the appropriate target-version synchronization message structure based on the type of data exchange message received, and may copy the data from the data exchange message to the target-version synchronization message structure to create the target-version synchronization message. The target-version migration bridge 525 sends the target-version synchronization message to the target-version application server 530 (step 566). In some implementations, the data exchange message also may be stored by the target-version migration bridge 525.

The target-version application server 530 receives the target-version synchronization message (step 568) and validates the data in the target-version synchronization message (step 570). For example, the target-version application server 530 may use application-specific functions that are appropriate to the received data. The application-specific functions may be the same or different as the application-specific functions used in the target-version application program to validate data entered by the users of the target-version application program. If the received data was validated successfully, then the target-version application server is updated with the received data (step 572).

The target-version application server 530 creates a synchronization notification message that indicates whether the data received in the data exchange message was successfully validated and sends the synchronization notification message to the target-version migration bridge 525 (step 574). The target-version migration bridge 525 receives the synchronization notification message sent by the target-version application server 530 and sends the acknowledgment message to the starting-version migration bridge 520 (step 575). The starting-version migration bridge 520 receives and sends the synchronization notification message to the starting-version application server 515 (step 576).

The starting-version application server 515 receives the synchronization notification message (step 578). When the synchronization notification message indicates that the data had been successfully validated by the target-version application server 530, the starting-version application server data is updated (step 580) and the starting-version mobile client 510 also is updated (step 582). When the synchronization notification message indicates that the data had not been successfully validated by the target-version application server 530, the starting-version mobile client 510 takes appropriate action based on the content of the message, automatically or as directed by a user. For example, if the synchronization notification message indicates that the data was not validated successfully (which may be referred to as rejecting the data) by the target-version application server 530, the starting-version application mobile client 510 may remove the data associated with the data exchange message from the starting-version application server data or may attempt to correct the data in the starting-version application-server data and re-send the data exchange message with the corrected data. The starting-version application server 515 may send an acknowledgement message to the starting-version migration bridge 520 (not shown).

After the target-version application server 530 has been updated with the data sent from the starting-version application server using the migration bridge, a target-version mobile client, such as target-version mobile client 252 in FIG. 2, may synchronize the data stored on the mobile client with data stored on the target-version application server 530. During the synchronization process, the target-version mobile client may receive data from the target-version application server 530 that was updated based on one or more data exchange messages received from the starting-version migration bridge 520. The synchronization process may be a function of the target-version application program or a function of the middleware.

In some implementations the type of synchronization notification message may be based on whether the data has been successfully validated. For example, when the data has been successfully validated, the synchronization notification message may be a synchronization confirmation message. When the data has not been successfully validated, the synchronization notification message may be a synchronization rejection message.

Additionally or alternatively, the target-version migration bridge 525 may transform a synchronization notification message received from the target-version application server 530 and send the transformed synchronization notification message. For example, the target-version migration bridge 525 may transform a received synchronization notification message into a synchronization confirmation message or a synchronization rejection message for the starting-version mobile client 510 or other sender of a synchronization message. The target-version migration bridge 525 then sends the transformed message to the starting-version migration bridge 520 that receives the transformed message. The starting-version migration bridge 520 then sends the transformed message to the starting-version application server 515. The starting-version application server 515 sends the received transformed message to the starting-version mobile client 510, the originator or sender of the synchronization message to which the transformed message applies.

Implementations may include a method or process, an apparatus or system, or computer software on a computer medium. It will be understood that various modifications may be made. For example, advantageous results still could be achieved if steps of the disclosed techniques were performed in a different order and/or if components in the disclosed systems were combined in a different manner and/or replaced or supplemented by other components.

The benefits from the described data migration techniques are not limited to upgrading a computing environment including mobile clients and may be applicable to upgrading a computing environment that includes on-line clients. The benefits from the described data migration techniques are not limited to the illustrated implementations. For example, some implementations may different data management systems, data structures, or system configurations.

Some implementations may store data for the application in an object-oriented database that physically organizes data into a series of objects, a relational database, or another type of data management system. A relational database may logically organize data into a series of database tables, each of which may arrange data associated with an entity in a series of columns and rows. Each column may describe an attribute of the entity for which data is being stored, while each row may represent a collection of attribute values for a particular entity.

A relational database may be used to store object data. Data also may be stored physically in one or more relational database tables and organized logically as a series of objects. A relational database table may be used to store data belonging to a particular object class, and each row in the relational database table may represent an object instance.

Another implementation may store data in a way that does not use a relational or object database. For example, a series of XML documents may be used. XML is a language similar to hypertext markup language (HTML), but with the additional flexibility of being able to describe data structures that can be processed directly as data by a program. Some implementations may use an XML file as a transfer data structure and/or data exchange message.

Some implementations may use a combination of object-oriented data management, relational database management, and other data management techniques to store data for the application program for the mobile client and the on-line client. Some implementations may use the same data management techniques for mobile clients and the application server that provides data to the mobile or on-line clients. Other implementations may use different data management techniques for mobile clients and the application server.

Some implementations may use same data structure in the data exchange messages as in the synchronization messages. Another implementation may not use a message type in a data exchange message. Such an implementation may only use a single data transfer structure for data exchange messages or may otherwise identify the type of message, such as by embedding a type identifier in the name of the data exchange message.

Some implementations may use only one type of data transfer structure for messages used to transfer data from the starting version to the target version of the application program. Other implementations may use different types of data transfer structures for sending messages based on various data structures, such as using one type of transfer data structure for product order data and another type of transfer data structure for customer information.

Some implementations may send the actual data values using a data exchange message. Other implementations may send key identifiers for segments or records that have been changed in addition to or as an alternative to sending the actual data values.

Some implementations may use a data exchange message that is structured the same or similar to a particular message structure, such as the message structure that is used for synchronizing data between the mobile clients and the application server components. A data exchange message that is structured the same as the message structure of the target version of the application program may be advantageous when the target version contains additional data structures that have not been included in the starting version. Some implementations may base the structure of the data exchange message on the data structure of the starting version or may employ a mixed model in which some data exchange messages correspond to data structures in the starting version while other data exchange messages correspond to data structures in the target version. Other implementations may use different formats for data exchange messages. For example, some implementations may use a fixed length record that contains all attributes and populates the attributes with the changed values. Some implementations may use a combination of techniques, for example, by using a fixed length record and a deletion indicator that is inserted as the attribute value when an attribute value has been deleted. Alternatively or additionally, some implementations may permit a user or group of users to add data to one or more data transfer structures used for data exchange messages. This may be done, for example, to reflect enhancements made by the users to the starting version and/or the target version.

Some implementations may add to the data exchange message data that was not received in the starting-version synchronization message. For example, when the target-version of the application program includes data that is not included in the starting-version of the application program, default data may be added based on a particular assumption, based on an assumption that varies based on the type of synchronization message data structure used, or based on decision logic that uses one or more data fields to determine what kind of default data should be added to the data exchange message. The target-version of the application program may include data that is not included in the starting-version of the application program. This may occur, for example, when additional data fields or segments have been added to the target version by the vendor of a commercial-off-the-shelf (COTS) product, or when one or more users have enhanced the COTS product to include additional data fields not included in the COTS product delivered by the vendor.

Some implementations may use different computer system configurations. For example, some implementations may not have on-line clients or may have on-line clients on both the starting-version and target-version of the application program. Some implementations may use a single computer system to host both the starting version and target version of the application program.

Some implementations may perform other data conversions or transformations. For example, when the target version of an application program uses different key structures than those key structures used in the starting version, the migration bridge may transform the data exchanged between the two versions. This may be accomplished by having the migration bridge perform data transformations such that the key structures between the two versions of the application program are updated appropriately. For example, if the starting-version application program uses foreign key structures and the target-version application program uses a global unique identifier rather than a foreign key structure, the target-version migration bridge may transform each foreign key structure into a global unique identifier by using a table or list that indicates the correspondence between foreign key structures and global unique identifiers.

Some implementations may use application-specific code to migrate data in addition to or in conjunction with middleware. Other implementations may use middleware that uses the same message structure for all data exchange structures or may use different message structures based on the type of computer platform that is receiving the data exchange message (e.g., an XML (Extensible Markup Language) document may be used to communicate with a web server hosting an application program and a proprietary format may be used when exchanging messages within components of the application server).

The benefits from data migration techniques described are not limited to updating mobile clients operating a commercial off-the-shelf product using two different servers during the data migration and are equally applicable to other contexts. For example, these techniques may be used to migrate data in a custom-developed application program or to use a migration bridge for data exchange between two versions of an application program operating on the same server. These techniques may be applied to an implementation that does not use middleware to separate the communication between the two versions of the application program from the business functions. Other implementations are within the scope of the following claims.

What is claimed is:

1. A computer-implemented method for operating two versions of an application program while in the process of upgrading from a starting-version application to a target-version application, a computing environment including one or more groups of mobile clients, the method comprising:
   operating a starting-version application including stored instructions of the starting-version application and stored data associated with the starting-version application, the starting-version application being accessible to one or more starting-version mobile clients;
   operating a target-version application including stored instructions of the target-version application and stored data associated with the target-version application, the target-version application being accessible to one or more target-version mobile clients;
   sending from the starting-version application a data exchange message including one or more starting-version data modifications associated with the data exchange message, a starting-version data modification being based on a data modification made using one of the one or more starting-version mobile clients; and
   in response to the data exchange message, storing the one or more starting-version data modifications associated with the data exchange message in the stored data associated with the target-version application such that the one or more starting-version data modifications are available to one of the one or more target-version mobile clients.

2. The method of claim 1 further comprising identifying one or more starting-version data modifications to be sent from the starting-version application.

3. The method of claim 1 further comprising:
   modifying one or more of the starting-version mobile clients from accessing the starting-version application to accessing the target-version application; and
   repeating the modifying until all starting-version mobile clients have been modified to access the target-version application.

4. The method of claim 1 wherein:
   operating the starting-version application comprises operating a starting-version application using a first computer system, and
   operating the target-version application comprises operating a target-version application using a second, different computer system.

5. The method of claim 1 wherein operating the starting-version application and the target-version application comprises using a single computer system to operate both applications.

6. The method of claim 1 wherein storing the one or more starting-version data modifications associated with the data exchange message in the stored data associated with the target-version application comprises:
   having the target-version application validate the one or more starting-version data modifications associated with the data exchange message,
   storing the one or more starting-version data modifications associated with the data exchange message such that the one or more starting-version data modifications are available to one of the one or more target-version mobile clients only when the one or more starting-version data modifications associated with the data exchange message are valid,
   sending an acknowledgement message to the starting-version application, and
   storing the one or more starting-version data modifications associated with the data exchange message such that the one or more starting-version data modifications are available to one of the one or more starting-version mobile clients only when the one or more starting-version data modifications associated with the data exchange message are valid.

7. The method of claim 1 wherein operating the target-version application comprises making the target-version application accessible to one or more target-version mobile clients and one or more on-line clients.

8. The method of claim 1 further comprising:
   receiving a starting-version synchronization message and one or more starting-version data modifications associated with the starting-version synchronization message from a starting-version mobile client, and
   copying the one or more starting-version data modifications associated with the starting-version synchronization message into the data exchange message.

9. The method of claim 8 further comprising:
   copying the one or more starting-version data modifications associated with the data exchange message into a target-version synchronization message,
   associating the one or more starting-version data modifications with the target-version synchronization message, and
   sending the target-version synchronization message and the one or more starting-version data modifications associated with the target-version synchronization message to at least one of the one or more target-version mobile clients.

10. The method of claim 1 wherein the data exchange message comprises a first data exchange message, further comprising:
    sending a second data exchange message from the target-version application along with one or more target-version data modifications associated with the second data exchange message; and
    storing the one or more target-version data modifications associated with the second data exchange message in the stored data associated with the starting-version application such that the one or more target-version data modifications are available to at least one of the one or more starting-version mobile clients.

11. The method of claim 10 further comprising:
    receiving a target-version synchronization message and the one or more target-version data modifications associated with the target-version synchronization message from a target-version mobile client, and copying the one or more target-version data modifications associated with the target-version synchronization message into the second data exchange message.

12. The method of claim 11 further comprising:
copying the one or more target-version data modifications associated with the second data exchange message into a starting-version synchronization message,
associating the one or more target-version data modifications with the starting-version synchronization message, and
sending the starting-version synchronization message and one or more target-version data modifications associated with the starting-version synchronization message to at least one of the one or more starting-version mobile clients.

13. The method of claim 11 wherein the structure of the second data exchange message is the same as the structure of the first data exchange message.

14. The method of claim 11 wherein the structure of the second data exchange message is different from the structure of the first data exchange message.

15. A computer-readable storage medium having embodied thereon a computer program configured to operate two versions of an application program while in the process of upgrading from a starting-version application to a target-version application, a computing environment including one or more groups of mobile clients, the medium comprising one or more code segments configured to:
operate a starting-version application accessible to one or more starting-version mobile clients, the starting-version application including stored instructions of the starting-version application and stored data associated with the starting-version application;
operate a target-version application accessible to one or more target-version mobile clients, the target-version application including stored instructions of the target-version application and stored data associated with the target-version application;
send from the starting-version application program a data exchange message including one or more starting-version data modifications associated with the data exchange message, a starting-version data modification being based on a data modification made using one of the one or more starting-version mobile clients; and
in response to the data exchange message, store the one or more starting-version data modifications associated with the data exchange message in the stored data associated with the target-version application such that the one or more starting-version data modifications are available to one of the one or more target-version mobile clients.

16. The medium of claim 15 further comprising one or more code segments configured to identify one or more starting-version data modifications to be sent from the starting-version application.

17. The medium of claim 15 wherein the one or more code segments configured to store the one or more starting-version data modifications associated with the data exchange message comprise one or more code segments configured to:
have the target-version application validate the one or more starting-version data modifications associated with the data exchange message,
store the one or more starting-version data modifications associated with the data exchange message such that the one or more starting-version data modifications are available to one of the one or more target-version mobile clients only when the one or more starting-version data modifications associated with the data exchange message are valid,
send an acknowledgement message to the starting-version application, and
store the one or more starting-version data modifications associated with the data exchange message such that the one or more starting-version data modifications are available to one of the one or more starting-version mobile clients only when the one or more starting-version data modifications associated with the data exchange message are valid.

18. The medium of claim 15 wherein the one or more code segments configured to operate the target-version application comprise one or more code segments configured to make the target-version application accessible to one or more target-version mobile clients and one or more on-line clients.

19. The medium of claim 15 further comprising one or more code segments configured to:
receive a starting-version synchronization message and one or more starting-version data modifications associated with the starting-version synchronization message from a starting-version mobile client, and
copy the one or more starting-version data modifications associated with the starting-version synchronization message into the data exchange message.

20. The medium of claim 19 further comprising one or more code segments configured to:
copy the one or more starting-version data modifications associated with the data exchange message into a target-version synchronization message,
associate the one or more starting-version data modifications with the target-version synchronization message, and
send the target-version synchronization message and the one or more starting-version data modifications associated with the target-version synchronization message to at least one of the one or more target-version mobile clients.

21. The medium of claim 15 further comprising one or more code segments configured to:
send a second data exchange message from the target-version application along with one or more target-version data modifications associated with the second data exchange message; and
store the one or more target-version data modifications associated with the second data exchange message in the stored data associated with the starting-version application such that the one or more target-version data modifications are available to at least one of the one or more starting-version mobile clients.

22. The medium of claim 21 further comprising one or more code segments configured to:
receive a target-version synchronization message and the one or more target-version data modifications associated with the target-version synchronization message from a target-version mobile client, and
copy the one or more target-version data modifications associated with the target-version synchronization message into the second data exchange message.

23. The medium of claim 22 further comprising one or more code segments configured to:
copy the one or more target-version data modifications associated with the second data exchange message into a starting-version synchronization message, associate the one or more target-version data modifications with the starting-version synchronization message, and send the starting-version synchronization message and one or more target-version data modifications associated with the starting-version synchronization message to at least one of the one or more starting-version mobile clients.

* * * * *